United States Patent

[11] 3,588,692

| [72] | Inventor | Oscar H. Koski<br>Richland, Wash. |
|---|---|---|
| [21] | Appl. No. | 799,167 |
| [22] | Filed | Feb. 14, 1969 |
| [45] | Patented | June 28, 1971 |
| [73] | Assignee | The United States of America as represented by the United States Atomic Energy Commission |

[54] CIRCUIT FOR DEVELOPING A PULSE HAVING AN AMPLITUDE DETERMINED BY THE CAPACITANCE OF A CAPACITOR COUPLED THERETO
1 Claim, 3 Drawing Figs.

| [52] | U.S. Cl. | 324/60R, 324/127 |
|---|---|---|
| [51] | Int. Cl. | G01r 11/52 |
| [50] | Field of Search | 324/60, 111, 127, 102, 70 |

[56] References Cited
UNITED STATES PATENTS

| 2,304,535 | 12/1942 | Bush | 324/102 |
|---|---|---|---|
| 2,455,543 | 12/1948 | Williams | 324/60 |
| 2,766,428 | 10/1956 | Sippach, Jr. | 324/60X |
| 3,064,188 | 11/1962 | Dreiske | 324/70 |
| 3,414,792 | 12/1968 | Mui et al. | 324/60X |

Primary Examiner—Edward E. Kubasiewicz
Attorney—Roland A. Anderson

ABSTRACT: A power supply is connected across a capacitor, via a resistor and the primary windings of a pulse transformer, for charging the capacitor to a predetermined voltage. A pulse generator excites a transistor switch connected across the primary windings of the transformer and the capacitor to periodically discharge the capacitor through the primary windings. The periodic discharges of the capacitor through the primary windings of the pulse transformer induces in the secondary windings output pulses which have an amplitude proportional to the capacitance of the capacitor.

Inventor
Oscar H. Koski
Attorney 3,588,692

CIRCUIT FOR DEVELOPING A PULSE HAVING AN AMPLITUDE DETERMINED BY THE CAPACITANCE OF A CAPACITOR COUPLED THERETO

CONTRACTUAL ORIGIN OF THE INVENTION

The invention described herein was made in the course of, or under, a contract with the UNITED STATES ATOMIC ENERGY COMMISSION.

BACKGROUND OF THE INVENTION

The present invention relates to devices for remote measurements of physical variables and in particular to an electrical device for measuring the capacitance of a remotely positioned capacitor.

Electrical capacitance is frequently used as an inferential measure of position, pressure, liquid level, eccentricity, or other physical parameters. For example, changes in the liquid level in a tank may be measured using a capacitance probe embodying concentrically mounted cylinders positioned in the liquid such that a change in the level of the liquid in the tank causes an equal level change in the liquid between the concentric cylinders and hence a change in the capacitance of the probe. This capacitance change is then measured by a conventional radiofrequency bridge with the capacitance probe forming one leg of the bridge to provide a measure of the change in liquid level. In certain applications, however, the probe, whose capacitance is to be measured, is positioned in a remote location requiring the use of long cables. The capacitance of a long cable in the bridge leg containing the probe reduces the sensitivity of the radiofrequency bridge in detecting incremental changes in the capacitance of the probe that are orders of magnitude smaller than the capacitance of the cable, thus limiting the use of a conventional radiofrequency bridge when the capacitance probe is positioned in a remote location.

It is therefore an object of this invention to provide improved means for converting the capacitance of a capacitor into an electrical signal proportional thereto.

It is another object of this invention to provide improved means for measuring the capacitance of a remotely positioned capacitor.

It is still another object of this invention to provide improved means for measuring the variable capacitance of a remotely positioned capacitance probe.

SUMMARY OF THE INVENTION

In general, the capacitance to pulse height conversion device of the present device comprises means for charging to a predetermined voltage level the capacitor whose capacitance is to be measured and means for shunting the capacitor to produce a discharge current therefrom. Means responsive to the rate of change of discharge current produces an output pulse having an amplitude proportional thereto.

BRIEF DESCRIPTION OF THE DRAWINGS

A more complete understanding of the invention will best be obtained from consideration of the accompanying drawings in which.

PREFERRED EMBODIMENT OF THE INVENTION

Figure 1:
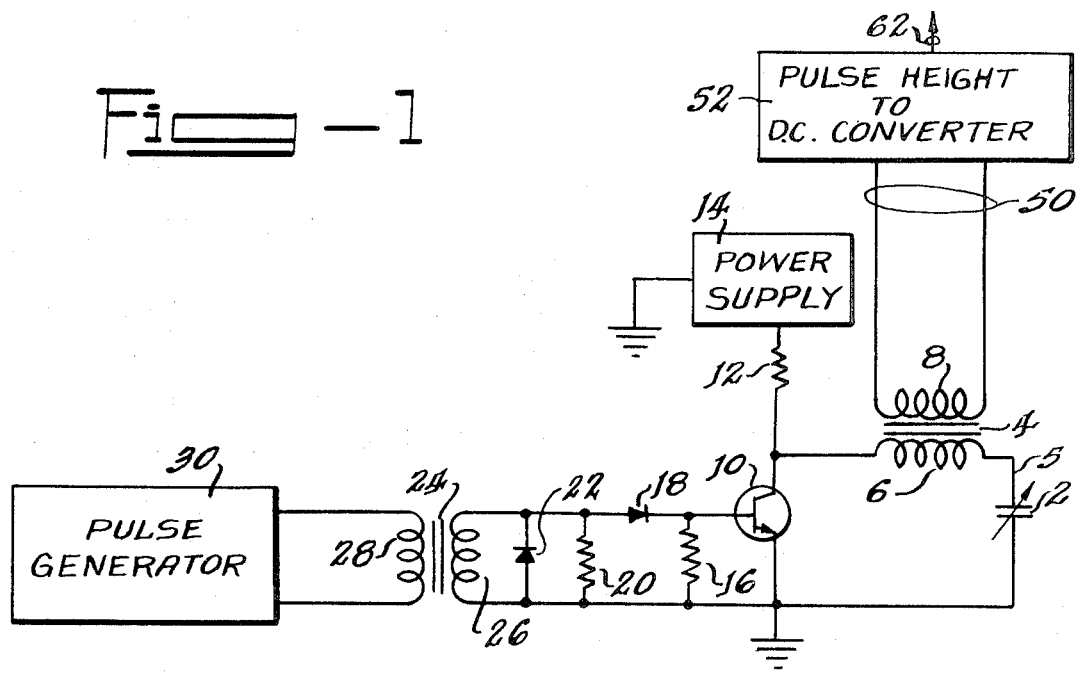
FIG. 1 is a circuit diagram illustrating a preferred embodiment of this invention.

Referring now to FIG. 1, a capacitance probe is represented by a variable capacitor 2 having an unknown capacitance C. One side of the capacitor 2 is connected to the collector of a transistor 10, via the primary winding 6 of a pulse transformer 4 and a coaxial cable 5. The other side of the capacitor 2 is connected to the emitter of the transistor 10 and a reference potential. The collector of the transistor 10 is also connected to a power supply 14, via a resistor 12. The transformer 4, transistor 10, resistor 12, and power supply 14 are physically placed as close as possible to the capacitor 2 to insure that the total capacitance of the lines interconnecting these components is small as compared to the capacitance C of the capacitor 2. The base of the transistor 10 is connected to the cathode terminal of a diode 18 and, via a resistor 16, to the emitter of the transistor 10. The anode of the diode 18 is connected to the emitter of the transistor 10, via the parallel connected circuit of a resistor 20, a diode 22, and the secondary winding 26 of a pulse transformer 24. The primary winding 28 of the pulse transformer 24 are connected to the output terminals of a pulse generator 30. The secondary winding 8 of the pulse transformer 4 are connected via a transmission line 50 such as shielded cable, to a pulse height-to-DC converter 52 which produces an output on line 62.

Operation of the device is as follows. When transistor 10 is "off" or not conducting, capacitor 2 charges to the voltage output of the power supply 14 via resistor 12 and the primary winding 6 of the transformer 4. When the transistor 10 is "on" or conducting, capacitor 2 is effectively shunted and, if previously charged, produces a discharge current through the primary winding 6 of the pulse transformer 4, thereby inducing across the secondary winding an output pulse which has an amplitude proportional to the capacitance C of capacitor 2.

In particular, the discharge current, $I_p$, through the primary winding 6 can be represented as a damped sinusoidal function:

$$I_p = \frac{E_o C}{b} e^{-aT} \sin bT$$

wherein,
$E_o$ = Voltage output level of supply 14
C = Capacitance of capacitor 2
T = time
$a$ and $b$ are complex circuit parameters.

The maximum voltage induced in the secondary winding 8 is proportional to the rate of change of the discharge current in the primary winding 6 at T=0, and is equal to $kE_oC$, where $k$ is a proportionality constant. Thus, the peak amplitude of the output pulse of the pulse transformer 4 is proportional to the capacitance C. The value of the proportionality constant, $k$, is determined by calibrating the device, including transmission line 50, using capacitors with known capacitances in place of capacitor 2.

The "on"-"off" conditions of the transistor 10 are controlled by the output of the pulse generator 30. Transistor 10 is biased such that with no output from the pulse generator 30 it is in the "off" condition, allowing capacitor 2 to charge to the voltage output of the power supply 14. A pulse, produced by the pulse generator 30 and coupled across the pulse transformer 24, turns on transistor 10 for the duration of the pulse, thereby shunting the capacitor 2 via the primary winding 6 of the pulse transformer 4. The output of the pulse generator 30 will thus alternately charge and discharge capacitor 2, thereby inducing across the secondary winding 8 of the pulse transformer 4 a series of output pulses each having an amplitude proportional to the capacitance C of capacitor 2. Furthermore, and in contrast to conventional radiofrequency bridge measurement devices, in the present device the capacitance of the long transmission lines required for measuring the unknown capacitance of a remotely positioned capacitor is effectively removed from the circuit which converts the unknown capacitance into a pulse whose height is proportional thereto.

The series of output pulses across secondary winding 8 of pulse transformer 4 are transmitted, via transmission line 50, to pulse height-to-DC converter 52, which produces a DC voltage on output line 62 proportional to the peak amplitude of the output pulses and hence to the capacitance C of the capacitor 2.

Figure 2:
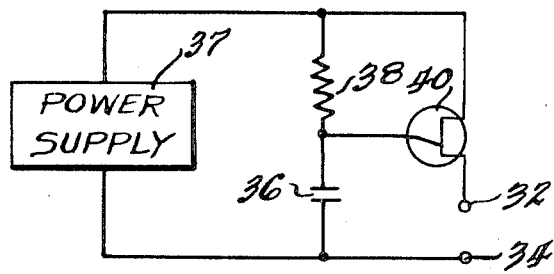
FIG. 2 is an exemplary circuit diagram of the pulse generator in FIG. 1.

A typical pulse generator 30 for operation with the apparatus of FIG. 1 is shown in detail in FIG. 2 and comprises a unijunction-transistor relaxation-oscillator circuit. In operation of this circuit, a capacitor 36 is charged by a power supply 37, via a resistor 38, until the emitter of a unijunction transistor 40 reaches the emitter peak point voltage, at which time the unijunction turns on, thereby discharging capacitor 36 through the primary winding 28 of the pulse transformer 24 in FIG. 1 connected across terminals 32 and 34. When the voltage of the emitter of unijunction 40 reaches a fixed value characteristic of unijunction transistors, the unijunction transistor 40 turns off and the charge-discharge cycle repeats. The repeated discharge of the capacitor 36 via the unijunction transistor 40 and primary winding 28 of the pulse transformer 24 in FIG. 1 supplies a series of control pulses to the transistor 10 in FIG. 1, via the transformer 24.

Figure 3:
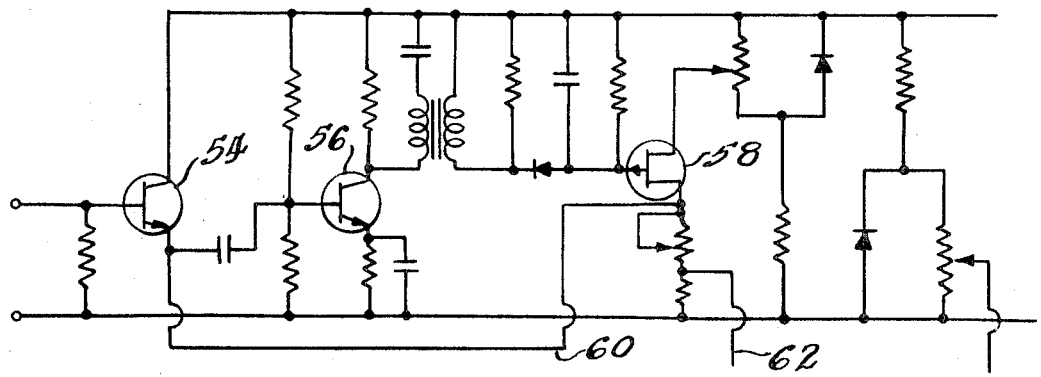
FIG. 3 is an exemplary circuit diagram of the pulse height-to-DC converter in FIG. 1.

A typical pulse height-to-DC converter 52 for operation with the apparatus of FIG. 1 is shown in detail in FIG. 3 and comprises a comparator stage formed by a transistor 54, an AC amplifier stage formed by a transistor 56, and a pulse height-to-DC current converter stage formed by a field effect transistor 58. The output of the field effect transistor 58 is fed back, via a line 60, to the emitter of transistor 54 to adjust the DC level thereof to the height of the input pulses which are applied to the base of transistor 54 via the transmission line 50 of FIG. 1. The output 62 of the pulse height-to-DC converter 52 may be connected to a calibrated readout device for recording.

It will be understood that the invention is not to be limited to the details given herein but that it may be modified within the scope of the appended claims.

The embodiments of the invention in which an exclusive property or privilege is claimed are defined as follows:

I claim:

1. A device for converting into a proportional DC electrical signal the capacitance of a remotely positioned capacitor having a pair of terminals comprising:
    a transistor including a collector, an emitter, and a base;
    a pulse transformer including a primary winding connected between the collector of said transistor and one of said pair of capacitor terminals, and a secondary winding;
    means for connecting the other of said pair of capacitor terminals to the emitter of said transistors;
    a resistor;
    a power supply for charging said capacitor to a predetermined voltage and having a first output thereof coupled through said resistor to said one terminal of said capacitor and a second output thereof connected to the other of said capacitor terminals, whereby a charging current is supplied to said capacitor through said resistor;
    a pulse generator having an output coupled to the base of said transistor for turning on said transistor in response to a pulse generator output signal, the capacitor providing a discharge current through said primary winding with said transistor turned on whereby a pulse is developed in said secondary winding;
    a pulse height-to-DC converter; and
    a transmission line interconnecting said secondary winding and said pulse height-to-DC converter for transmitting said pulses to said pulse height-to-DC converter.